US006768927B2

(12) United States Patent
Krogmann

(10) Patent No.: US 6,768,927 B2
(45) Date of Patent: Jul. 27, 2004

(54) CONTROL SYSTEM

(75) Inventor: Uwe Krogmann, Überlingen (DE)

(73) Assignee: Bodenseewerk Geratetechnik GmbH, Uberlingen (DE)

(*) Notice: Subject to any disclaimer, the term of this patent is extended or adjusted under 35 U.S.C. 154(b) by 417 days.

(21) Appl. No.: 09/820,770

(22) Filed: Mar. 29, 2001

(65) Prior Publication Data

US 2001/0034560 A1 Oct. 25, 2001

(30) Foreign Application Priority Data

Apr. 8, 2000 (DE) .......................................... 100 17 600

(51) Int. Cl.$^7$ ............................................. G05B 13/02
(52) U.S. Cl. ............................. 700/28; 700/29; 700/30; 700/12; 700/48; 700/47; 706/15; 706/16; 706/39; 244/3.15; 244/3.19; 701/2; 701/27
(58) Field of Search ............................... 700/28, 29, 30, 700/12, 48, 47; 706/15, 16, 39; 244/3.15, 3.19; 701/2, 27

(56) References Cited

U.S. PATENT DOCUMENTS

| | | | | |
|---|---|---|---|---|
| 5,159,661 A | * | 10/1992 | Ovshinsky et al. | 706/33 |
| 5,991,525 A | * | 11/1999 | Shah et al. | 703/2 |
| 6,064,332 A | * | 5/2000 | Cloutier | 342/62 |
| 6,244,536 B1 | * | 6/2001 | Cloutier | 244/3.19 |
| 6,285,971 B1 | * | 9/2001 | Shah et al. | 703/2 |

OTHER PUBLICATIONS

Mracek C.P. et al., "A New Technique for Nonlinear Estimation", *Proceedings of the 1996 IEEE International Conference on Control Applications* 338–343 (1996), XP–002240770.

Cloutier J.R. et al., "State–Dependent Riccati Equation Techniques: An Overview", *Proceedings of the American Control Conference* 932–936 (1997), XP–002240769.

Wise K.A. et al., "Nonlinear Control of Agile Missiles Using State Dependent Riccati Equations", *Proceedings of the American Control Conference* 379–380 (1997), XP–001031806.

He S. et al., "Solving Riccati Differential Equations with Multilayer Neural Networks", *Proceedings of the 36$^{th}$ Conference on Decision & Control* 2199–2200 (1997), XP–002240771.

Neidhoefer J. et al., "Intelligent Control for Near–Autonomous Aircraft Missions", *Systems, Man, and Cybernetics, IEEE International Conference* 3124–3129 (1998).

\* cited by examiner

*Primary Examiner*—Ramesh Patel
*Assistant Examiner*—Thomas Pham
(74) *Attorney, Agent, or Firm*—Scully, Scott, Murphy & Presser

(57) ABSTRACT

The invention relates to a control system to which a state vector representing the states of a controlled system is applied. The control system provides a correcting variables vector of optimized correcting variables. The relation between state vector and correcting variables vector is defined by a matrix of weights. These weights depend on the solution of the state dependent Riccati equation. An equation solving system for solving the state dependent Riccati equation in real time is provided. The state vector is applied to this equation solving system. The solution of the state dependent Riccati equation is transferred to the control system to determine the weights.

11 Claims, 3 Drawing Sheets

CONTROL SYSTEM

BACKGROUND OF THE INVENTION

The invention relates to a control system, to which a state vector representing the states of a controlled system is applied, and which provides a correcting variables vector of optimized correcting variables, the relation between the state vector and the correcting variables vector being defined by a matrix of weights, the weights being derived from an algorithmic solution of an optimization equation.

In control systems presently in use, all measured states of a controlled system are weighted and applied to all correcting variables. The states of the controlled system are combined in a state vector $\underline{x}$. The correcting variables are combined in a correcting variables vector $\underline{u}$. The weights are represented by a matrix. In order to achieve optimal control behavior, these weights have to be selected appropriately. The control system is optimized. The weights depend on the solution of an optimization equation such as the "state dependent Riccati equation" (SDRE). This solution is represented by a matrix $P(\underline{x})$ depending on the state vector.

In accordance with the prior art, the optimization equation, for example the state dependent Riccati equation, is computed off-line. From the solution $P(\underline{x})$ for the time-dependent state vector, a vector of optimal correcting variables $\underline{u}(\underline{x})$ is computed. As $\underline{x}$ is time-dependent, also a time-dependent correcting variables vector results. A neural network is trained in a learning process, various state vectors $\underline{x}$ being applied to the neural network during the learning process. Then the neural network provides the associated correcting variables vectors. These correcting variables vectors $\underline{u}(t)$ are compared with the optimized correcting variables vectors $\underline{u}_{opt}(t)$ which result from the off-line solution of, for example, the state dependent Riccati equation. The difference represents the learning signal for training the neural network. Then, the neural network thus trained represents the control system trained off-line, for example a guidance controller for missiles, which provides associated optimal correcting variables vectors $\underline{u}(t)$, when time-dependent state vectors $\underline{x}(t)$ are applied thereto.

Training of a neural network is cumbersome and requires the processing of large quantities of data. A control system obtained in this way is inflexible.

DISCLOSURE OF THE INVENTION

It is an object of the invention to improve a control system of the type defined in the beginning.

To this end, equation-solving means for algorithmically solving the optimization equation in real time are provided. The state vector is applied to these equation-solving means. The solution P(x) of the optimization equation is applied to the control system to determine the weights.

It has been found that the optimization equation, such as the state dependent Riccati equation, can be solved, at least substantially, in real time. This yields a solution $P(\underline{x})$ for each state vector $\underline{x}(t)$. This solution is applied to a control system and, therein, determines the weights of the state variables of the state vector $\underline{x}(t)$ applied also to the control system. The control system generates, therefrom, the optimal correcting variables of the optimal correcting Variables vector $\underline{u}_{opt}(t)$. With this design of the control system, the data quantities to be processed are smaller. Instead, high computing capacity is required.

The solution of the optimization equation requires a model of the controlled system. This model of the controlled system can be described by an equation $$\dot{x}=g(\underline{x},\underline{u},t).$$

For analytically solving, for example, the state dependent Riccati equation, this function is "factorized", i.e. is replaced by a form $$\dot{x}=F(\underline{x})\underline{x}+G(\underline{x})\underline{u},$$

wherein F and G are matrices depending on the state vector $\underline{x}$. This "factorizing" permits only a simplified model of the controlled system. This model may considerably deviate from reality. The real controlled system nearly always contains uncertainties of the parameters and/or non-linearities, which cannot be modeled in this form or which may, sometimes, not even be known.

In order to deal with these problems, an adaptive model of the controlled system is provided, to which the state vector and the correcting variables vector are applied and which provides an estimated value of the of the state vector. A first vectorial training signal for the adaptive model is represented by the difference of the actual state vector and the estimated value of the state vector. A second vectorial training signal for an adaptive network which is provided on the control system side and to which the state vector and the correcting variables vector are applied is derived from the trained model of the controlled system. This network on the side of the control system provides a correction quantity for correcting the optimal correcting variables vector resulting from the solution of the optimization equation at the control system, whereby an actual correcting variables vector to be applied to the controlled system is formed.

Preferably, to this end, the model of the controlled system has a first matrix $(F(\underline{x}))$ which is multiplied by the state vector $\underline{x}$, and a second matrix $(G(\underline{x}))$ which is multiplied by the correcting variables vector $(\underline{u})$. The sum of the state and correcting variables vectors multiplied by the respective matrices, representing the time derivative of the state vector, is integrated to provide a model value of the state vector. An adaptive structure is provided, on the side of the controlled system, which provides a correcting value for correcting the model value of the state variable, this adaptive structure being trained by the first vectorial training signal.

According to another solution, a structure trained off-line has an input to which the state vector $(\underline{x})$ of the controlled system is applied, and an output which provides a correcting variables vector $(\underline{u})$, the correcting variables of the correcting variables vector being applied to the controlled system. The state vector $(\underline{x})$ is applied on-line to the equation solving means, whereby the equation solving means provide an optimal correcting variables vector $(\underline{u}_{opt}(t))$. The difference of the correcting variables vector $(\underline{u}(t))$ provided by the adaptive structure and of the optimal correcting variables vector $(\underline{u}_{opt}(t))$ is applied on-line to the adaptive structure as a training signal.

The control system has an adaptive structure such as a neural network, which is trained off-line to represent an optimal control system. This structure provides stable control, which may, however, not be optimal in some ranges of the state space. In addition thereto, the optimization equation such as the state dependent Riccati equation is solved in real time. The correcting variables vector obtained thereby for the respective time-dependent state vector is compared to the correcting variables vector provided by the adaptive structure arid, thereby, serves to continuously further train the adaptive structure "on-line".

The weight factors for providing the optimal correcting variables vector may be determined, instead of by the state dependent Riccati equation, also by other optimization equations. The control system may, for example, be a LQ-controller. The described procedure of correcting a model of the control system by means of an adaptive structure such as a neural network and of correcting the optimal correcting variables vector through the control system by means of a second adaptive structure trained by the corrected model of the control system may, if required, also be used with an -already available- control system operating with proportional navigation or extended proportional navigation, in order to improve the control behavior thereof.

The adaptive structure may be a neural network or a fuzzy-neural network or an adaptive fuzzy logic unit. The adaptive structure may also be trained off-line with knowledge about the dynamic behavior of the controlled system in a simulation process.

Embodiments of the invention are described hereinbelow with reference to the accompanying drawings:

PREFERRED EMBODIMENTS OF THE INVENTION

Figure 1:
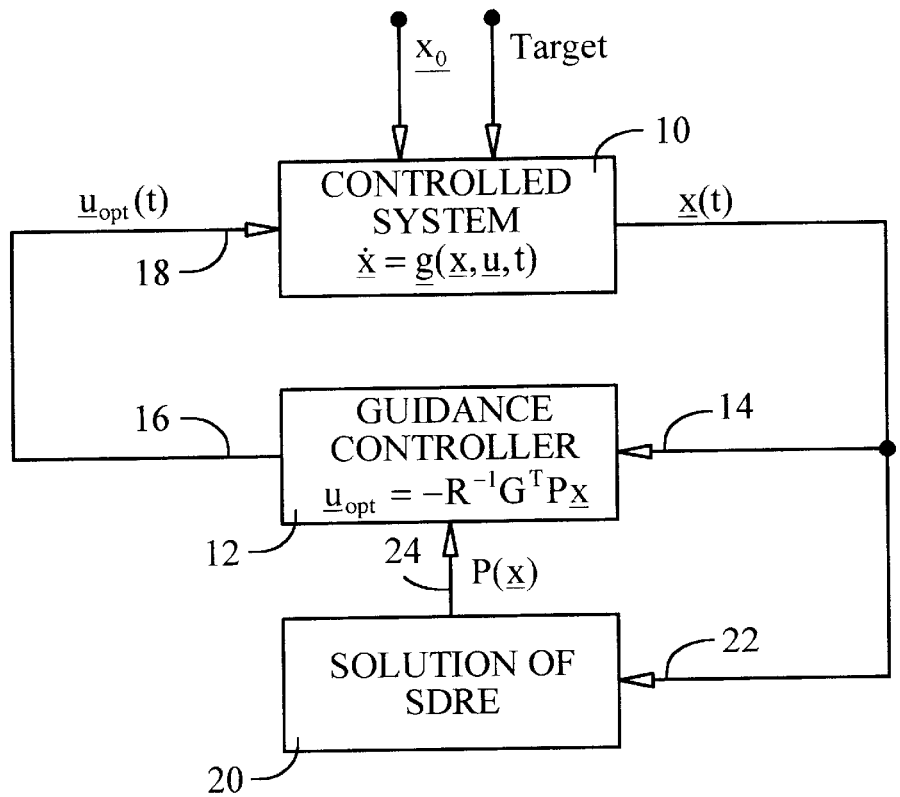
FIG. 1 shows a block diagram of a control system with "on-line" solution of the state dependent Riccati equation.

Referring to FIG. 1, numeral 10 designates a controlled system. The controlled system may be a missile which tracks a target, the trajectory of the missile to the target being to be controlled. The controlled system can be described by an equation $\dot{\underline{x}}=g(\underline{x},\underline{u},t)$, $\underline{x}$ being a state vector, i.e. a vector of the state variables of the controlled system, $\underline{u}$ being a correcting variables vector, i.e. a vector of the available correcting variables, t being the time, an g designating a function. The controlled system is affected by disturbances, which are combined in a vector $\underline{x}_0$, and—with a guidance controller for missiles—by the motions of a target to which the missile is to be guided. The controlled system 10 is controlled by a controlling system 12. The state vector $\underline{x}(t)$ of the controlled system 10 is applied to the controlling system 12. The state vector $\underline{x}(t)$ represents the input variables of the controlling system 12 at an input 14. The controlling system, for example a guidance controller of a missile, provides correcting variables, which are combined in a correcting variables vector $\underline{u}$. The correcting variables vector $\underline{u}(t)$ is linked with the state vector $\underline{x}(t)$ through a matrix, i.e. each correcting variable of the correcting variables vector $\underline{u}$ is dependent on each state variable of the state vector $\underline{x}$ through a weight factor, an element of the matrix. The correcting variables of the correcting variables vector $\underline{u}$ are applied to the controlled system from an output 16 of the controlling system 10. This is symbolized in FIG. 1 by an "input" 18. Now, the weight factors of the matrix of the controlling system 10 are to be selected such that optimal control behavior is achieved. This is indicated by the designation "$\underline{u}_{opt}(t)$" in FIG. 1.

In FIG. 1, this optimization of the weight factors is achieved by solving the SDRE ("state dependent Riccati equation") on-line. The equation solving means 20 for the on-line solution of the state dependent Riccati equation are represented by a block 20 in FIG. 1. The time-dependent state vector $\underline{x}(t)$ is applied to an input 22 of the equation solving means 20. The equation solving means 20 provide, as a solution, a matrix P($\underline{x}$). This matrix P($\underline{x}$) is applied to the control system 12, as indicated by arrow 24. Then the control system represents the optimal weight matrix $-R^{-1}G^TP$.

Figure 2:
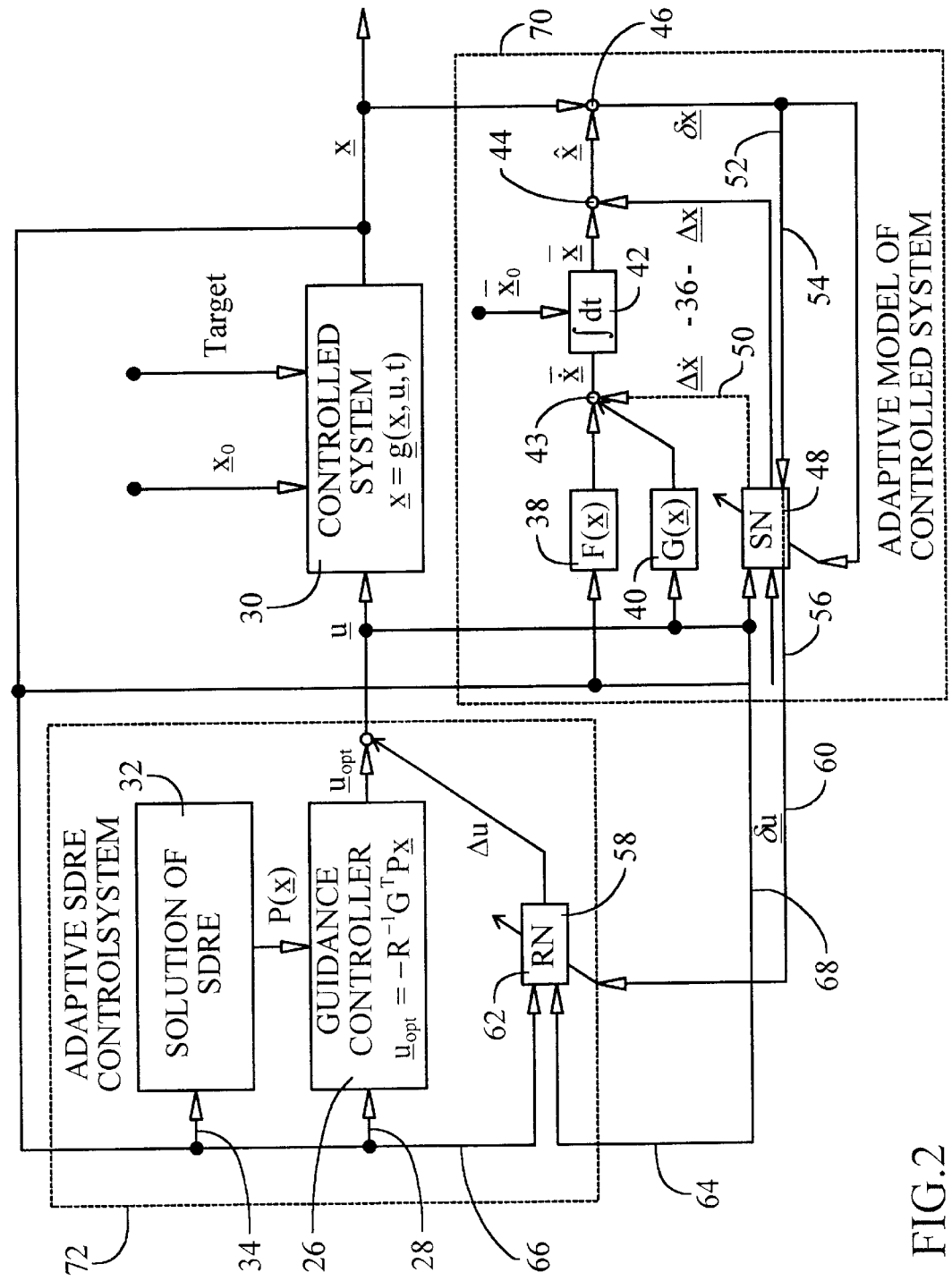
FIG. 2 shows a block diagram of a control system wherein a correction of the model of the controlled system and a correction of the control system effected by training procedures.

The solution of the state dependent Riccati equation is based on the factoring given above: $\dot{\underline{x}}=F(\underline{x})\underline{x}+G(\underline{x})\underline{u}$. This factoring may, however, not be able to model the controlled system sufficiently. In the embodiment of FIG. 2, adaptive structures are used to correct the modeling of the controlled system and to correct, in turn, the control system in accordance with this correction.

Referring to FIG. 2, numeral 26 designates a controlling system similar to the controlling system 10 of FIG. 1. The state vector $\underline{x}$ of a controlled system 30 is applied to the controlling system 26 through an input 28. Equation solving means 32, to which the state vector $\underline{x}$ is also applied through an input 34, provide a solution P($\underline{x}$) of the state dependent Riccati equation. This solution P($\underline{x}$) is applied to the controlling system 26. Thereby, the weights of the weight matrix of the controlling system 26 are optimized. The controlling system 26 provides a correcting variables vector $\underline{u}_{opt}$.

This is substantially the structure of FIG. 1. The controlling system may be a guidance controller which guides a missile to a target, this guidance representing the controlled system.

A model 36 of the controlled system is provided for the controlled system 30, this model underlying the SDRE. The state vector $\underline{x}$ is multiplied by a Function F($\underline{x}$), which is represented by a block 38. The correcting variables vector $\underline{u}$ is multiplied by a function G($\underline{x}$), which is represented by a block 40. The products are summed at a summing point 42. This yields the time derivative $\dot{\tilde{x}}$ of a model state vector. Integrating this time derivative $\dot{\tilde{x}}$ yields the model state vector $\tilde{x}$ itself. The integration is indicated by a block 42, the initial value $\tilde{x}_0$ being additionally supplied to this block 42.

The state vector $\tilde{x}$ thus obtained is corrected at a summing point 44 by a vectorial correcting value $\Delta\underline{x}$. This yields an estimated value $\hat{\underline{x}}$ of the state vector. The difference $\delta\underline{x}$ of the actually measured state vector $\underline{x}$ and the estimated value $\hat{\underline{x}}$ is formed at a summing point 46. This difference $\delta\underline{x}$ is applied to the neural network 48 on the side of the controlled system as a training signal. The neural network on the side of the controlled system provides the vectorial correcting value $\Delta\underline{x}$ which is applied to the summing point 44. Optionally, also a vectorial correcting value $\Delta\underline{x}$ may be applied to the summing point 44 by the neural network, as indicated by dashed connection 50. In this way, the model 36 on which the solution of the SDRE is based can be matched with the real controlled system.

This matched model now permits also the controlling system 26 to be matched. To this end, the difference $\delta\underline{x}$ is applied not only as a training signal to the neural network on the side of the controlled system but also is backpropagated through this controlled system-side neural network 48, as shown by connection 48. The neural network 48 trained as described receives, at an input 54, the difference $\delta\underline{x}$ and provides, at an output 56, a vector $\delta\underline{u}$. This vector $\delta\underline{u}$ serves as a training signal for a neural network on the side of the controlling system. This is illustrated by connection 60. The neural network 58 on the side of the controlling system receives the real state vector $\underline{x}$ at an input 62 and the correcting variables vector u at an input 64, as indicated by connections 66 and 68, respectively.

The adaptive model of the controlled system is designated by numeral 70. The adaptive controlling system is designated by numeral 72. The training procedures take place on-line.

Figure 3:
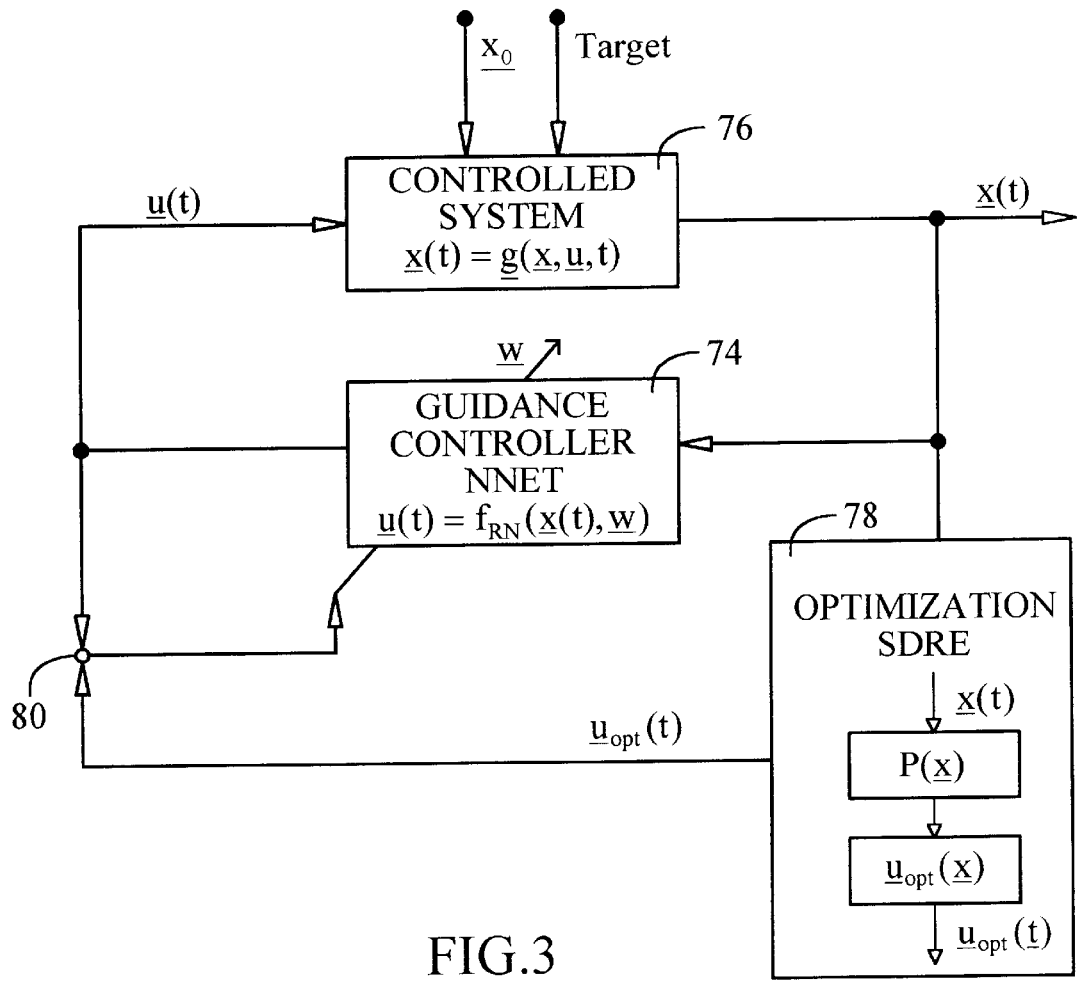
FIG. 3 shows a system, wherein a trained neural network used as control system is further trained on-line by a solution of the state dependent Riccati equation obtained in real time.

Referring to FIG. 3, the controlling system comprises a neural network 74. The neural network 74 is trained off-line. The neural network 74 receives a state vector x(t) from a controlled system 76, the state vector representing the state variables of the controlled system 76. The trained neural network 74 provides a correcting variables vector u(t), which represents the correcting variables vectors acting on the controlled system. Also here, the controlled system may be the process of tracking a target by a missile. This is conventional technology.

In the embodiment of FIG. 3, equation solving means 78 for solving the SDRE are additionally provided. These equation solving means 78 receive continuously the time-dependent state vector x(t) of the controlled system 76. The solution P(x) provided by the equation solving means permits the formation of an optimal correcting variables vector $u_{opt}(x)$ depending on the state vector and, as this state vector x is time-dependent, of a time-dependent optimal correcting variables vector $u_{opt}(t)$. At a summing point 80, this optimal correcting variables vector $u_{opt}(t)$ is compared with a real correcting variables vector u(t) provided by the neural network 74. The difference serves as a training signal for the neural network 74, whereby the neural network 74 is re-trained on-line.

In this way, the neural network 74 can be trained in real time in additional points of the state space.

Figure 4:
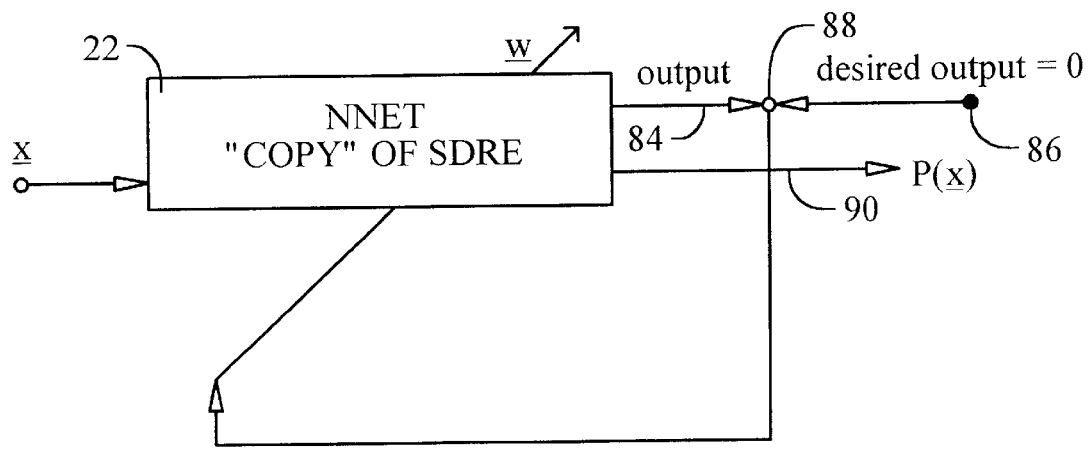
FIG. 4 shows a system, wherein a solution of the state dependent Riccati equation is found substantially in real time by means of a neural network imaging this equation.

FIG. 4 illustrates one mode of solving the SDRE in real time.

Referring to FIG. 4, numeral 82 designates a neural network. This neural network 82 represents a "copy" of the SDRE. The processor elements of the neural network 82 carry out the operation of a scalar product. The SDRE can be represented by scalar products. The output 84 of the neural network 82 should be zero. Therefore, a desired output of "0" is set. The desired output "0" is compared with the actual output at a summing point 88. The difference is a training signal by means of which the neural network 82 is trained, as indicated in FIG. 4. By this training, the weight factors of the neural network are set in such a way that "0" appears at the output 84. The relation between the state vector x at the input of the neural network and the vector "0" at the output is determined by a weight matrix. If the processor elements represent a "copy" of the SDRE, then the weight matrix after the training represents the solution P(x) of the SDRE. This solution is derived from output 90.

Also this training process can take place substantially in real time.

Figure 5:
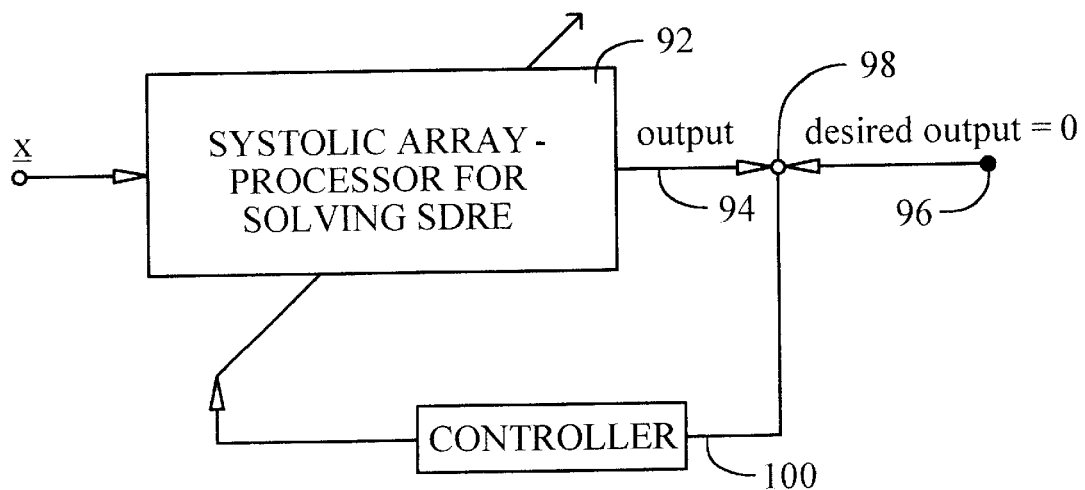
FIG. 5 shows another system, wherein a solution of the state dependent Riccati equation is found substantially in real time by means of a processor (systolic array processor) arranged in a control loop.

In the embodiment of FIG. 5, the neural network is replaced by a parallel processor for vector-matrix operations (such as a so-called "systolic array processor") 92. In this processor, the SDRE, is implemented by appropriate vector-matrix operations. The output 94 should yield "0". This is represented by a vector "0" at a desired output 96. The difference formed at a summing point 98 is applied to a controller 100. The controller 100 varies the P(x)-parameters of this implemented SDRE such that "0" appears at output 94. Then the parameters represent the solution of the SDRE.

I claim:

1. A control system having input means and output means, for controlling a controlled system having states which are represented by a state vector, comprising means for applying said state vector to said input means of said control system, said control system providing, at said output means, correcting variables which are represented by a correcting variables vector, the relation between said state vector and said correcting variables vector being defined by a matrix of weights, and further comprising equation solving means for algorithmically solving an optimization equation in real time and providing a solution of said optimization equation, and means for applying said state vector to said equation solving means, said solution of said optimization equation being transferred to said control system to determine said weights of said matrix, and an adaptive model means for modeling said controlled system and for providing, from said state vector and said correcting variables vector, an estimated value of said state vector, means for applying said state vector and said correcting variables vector to said adaptive model means, means for forming the difference of said state vector and said estimated value of the state vector to provide a first vectorial training signal for training said adaptive model means, and means for training said adaptive model means to reduce said difference, thereby to provide a trained model, means for deriving a second vectorial training signal from said trained model of said controlled system, a control system-side network, and means for training said control system-side network in accordance with said second vectorial training signal, means for applying said state vector and said correcting variables vector to said control system-side network, said network being trained by said second vectorial training signal to provide therefrom a correction value to be applied to said optimal correcting variables vector to form an actual correcting variables vector applied to said controlled system, whereby said control system provides an optimal correcting variables vector.

2. A control system as claimed in claim 1, wherein said optimization equation is the state dependent Riccati equation.

3. A control system as claimed in claim 1, wherein said adaptive model of said controlled system comprises first matrix means representing a first matrix and second matrix means for representing a second matrix, means for multiplying said state vector by said first matrix, and means for multiplying said second matrix by said correcting variables vector, means for summing said state and correcting variables vectors each multiplied by the respective one of said matrices to provide an estimated model value of the time derivative of said state vector, and means for integrating said time derivative to provide an estimated model value of said state vector, and further comprising controlled system-side adaptive network means having an input and an output for generating at said output a correction value to be applied to said estimated model value of said state vector, and means for training said controlled system-side adaptive network means in accordance with said first vectorial training signal.

4. A control system as claimed in claim 1, comprising means for applying said first vectorial training signal to said output of said controlled system-side adaptive means to provide, at said input thereof, said second vectorial training signal by back-propagation.

5. A control system as claimed in claim 1, and further comprising: an adaptive structure trained off-line and having an input and an output, said state vector being applied to said input and said adaptive structure providing said correcting variables vector at said output, said correcting variables of said correcting variables vector being applied to said controlled system, said state vector being applied on-line to said equation solving means, whereby said equation solving means provide an optimal correcting variables vector, means for forming the difference of said correcting variables vector provided by said adaptive structure and said optimal correcting variables vector, and means for training said adaptive structure on-line in accordance with said difference.

6. A control system as claimed in claim 1, wherein said equation solving means comprise: a matrix structure having variable elements and copying said optimization equation, said matrix structure having matrix elements and linking an input and an output, said state vector being applied to said input, and means for varying said matrix elements in real time depending on an output vector at said output to make said vector "0", and means for outputting said matrix elements as said solution of said optimization equation.

7. A control system as claimed in claim 6, wherein said matrix structure is an adaptive structure, and further comprising means for training said adaptive structure with a training signal represented by the deviation of said output vector from "0".

8. A control system as claimed in claim 6, comprising a parallel processor for vector-matrix multiplication having parameters, said processor defining said matrix structure, and control loop means for varying said parameters depending on the deviation of said output vector from "0".

9. A control system having input means and output means, for controlling a controlled system having at least one state represented by a state vector, comprising means for applying said state vector to said input means of said control system, said control system providing, at said output means, at least one correcting variable represented by a correcting variables vector, the relation between said state vector and said correcting variables vector being defined by a factor or a matrix of weights; and further comprising: adaptive model means for modeling said controlled system and for providing, from said state vector and said correcting variables vector, an estimated value of said state vector, means for applying said state vector and said correcting variables vector to said adaptive model means, means for forming the difference of said state vector and said estimated value of the state vector to provide a first vectorial training signal for training said adaptive model means, and means for training said adaptive model means to reduce said difference, thereby to provide a trained model, means for deriving a second vectorial training signal from said trained model of said controlled system, a control system-side network, and means for training said control system-side network in accordance with said second vectorial training signal, means for applying said state vector and said correcting variables vector to said control system-side network, said network being trained by said second vectorial training signal to provide therefrom a correction value to be applied to said optimal correcting variables vector to form an actual correcting variables vector applied to said controlled system.

10. A control system as claimed in claim 9, wherein said adaptive model of said controlled system comprises first matrix means representing a first matrix and second matrix means for representing a second matrix, means for multiplying said state vector by said first matrix, and means for multiplying said second matrix by said correcting variables vector, means for summing said state and correcting variables vectors each multiplied by the respective one of said matrices to provide an estimated model value of the time derivative of said state vector, and means for integrating said time derivative to provide an estimated model value of said state vector, and further comprising controlled system-side adaptive network means having an input and an output for generating at said output a correction value to be applied to said estimated model value of said state vector, and means for training said controlled system-side adaptive network means in accordance with said first vectorial training signal.

11. A control system as claimed in claim 9, comprising means for applying said first vectorial training signal to said output of said controlled system-side adaptive means to provide, at said input thereof, said second vectorial training signal by back-propagation.

\* \* \* \* \*